United States Patent [19]
Ganzel

[11] Patent Number: 6,132,013
[45] Date of Patent: Oct. 17, 2000

[54] ANTI-LOCK AND TRACTION CONTROL BRAKING SYSTEM USING NON-DRIVEN WHEEL BRAKE DE-ISOLATION

[75] Inventor: Blaise J. Ganzel, Ann Arbor, Mich.

[73] Assignee: Kelsey-Hayes Co., Livonia, Mich.

[21] Appl. No.: 08/936,956

[22] Filed: Sep. 25, 1997

Related U.S. Application Data

[60] Provisional application No. 60/026,481, Sep. 25, 1996.

[51] Int. Cl.[7] .................................................. B60T 8/24
[52] U.S. Cl. ............................................ 303/139; 303/10
[58] Field of Search ............................ 303/10, 11, 113.2, 303/115.2, 116.1, 116.2, 139, 113.4

[56] References Cited

U.S. PATENT DOCUMENTS

| | | | |
|---|---|---|---|
| 5,290,098 | 3/1994 | Burgdorf et al. | 303/113.2 |
| 5,299,858 | 4/1994 | Beck | 303/113.2 |
| 5,484,194 | 1/1996 | Reinartz et al. | 303/116.2 |
| 5,707,116 | 1/1998 | Tsuru et al. | 303/116.2 |

*Primary Examiner*—Paul N. Dickson
*Assistant Examiner*—Melanie Talavera
*Attorney, Agent, or Firm*—MacMillan, Sobanski & Todd, LLC; A. Michael Tucker

[57] ABSTRACT

A vehicular anti-lock and traction control braking system includes a master cylinder. A driven wheel brake is connected to the master cylinder via a first brake conduit. A non-driven wheel brake is connected to the master cylinder via a second brake conduit. A fluid supply is connected to an input of a pump. An output of the pump provides pressurized fluid to the driven and non-driven wheel brakes. A pump supply valve is disposed between the pump inlet and the fluid supply. A driven wheel isolation valve is disposed in the first brake conduit between the driven wheel brake and the master cylinder. The driven wheel isolation valve is opened to allow fluid communication between driven wheel brake and the master cylinder and closed to prevent fluid communication therebetween. A non-driven wheel isolation valve is disposed in the second brake conduit between the non-driven wheel brake and the master cylinder. The non-driven wheel isolation valve is opened to allow fluid communication between the non-driven wheel brake and the master cylinder and closed to prevent fluid communication therebetween. During a traction control event, the non-driven wheel isolation valve is opened to provide a circular fluid path from the pump output through the non-driven wheel isolation valve to the pump inlet.

15 Claims, 4 Drawing Sheets

ANTI-LOCK AND TRACTION CONTROL BRAKING SYSTEM USING NON-DRIVEN WHEEL BRAKE DE-ISOLATION

CROSS-REFERENCE TO RELATED APPLICATION

This application claims the benefit of U.S. provisional patent application identified as application Ser. No. 60/026,481, filed Sep. 25, 1996.

BACKGROUND OF THE INVENTION

This invention relates in general to a vehicular braking system, and in particular to a valve control scheme using non-driven wheel brake de-isolation for use in an anti-lock and traction control braking system.

Vehicles are commonly slowed and stopped with hydraulic braking systems. These systems vary in complexity but a base brake system typically includes a tandem master cylinder, pressure fluid conduit arranged in two similar but separate brake circuits, and a wheel brake cylinders in each circuit. The master cylinder generates hydraulic forces in both brake circuits by pressurizing brake fluid when the driver steps on the brake pedal. The pressurized fluid travels through the pressure fluid conduit in both circuits to actuate brake cylinders at the wheels and slow the vehicle.

Base braking systems typically use a brake booster to provide a force to the master cylinder which assists the pedal force created by the driver. The booster can be vacuum or hydraulically operated. A hydraulic booster uses pressurized fluid in a brake booster to move the master cylinder piston thereby increasing the master cylinder pressures generated when the driver applies the brakes. Hydraulic boosters are commonly located adjacent the master cylinder piston and use a boost valve to control the pressurized fluid applied to the booster. Typically the boost valve is connected with the booster in the master cylinder assembly and mechanically coupled to the brake pedal for proper operation.

Braking a vehicle in a controlled manner under adverse conditions requires precise application of the brakes by the driver. Under these conditions, a driver can easily apply excessive braking pressure thus causing one or more wheels to lock such that excessive slippage between the wheel and road surface takes place. Such wheel lock-up conditions can lead to greater stopping distances and possible loss of directional control.

Advances in braking technology have led to the introduction of anti-lock braking systems (ABS). An ABS monitors wheel rotational behavior and selectively applies and relieves brake pressure in the corresponding wheel brakes in order to maintain the wheel speed within a selected slip range while achieving maximum braking forces. While such systems arc typically adapted to control the braking of each braked wheel of the vehicle, some systems have been developed for controlling the braking of only a portion of the braked wheels.

Electronically controlled ABS valves, comprising isolation valves and dump valves, are located between the master cylinder and the wheel brake cylinders and perform the pressure regulation. Typically, when activated, these ABS valves operate in three pressure control modes; pressure apply, pressure dump and pressure hold. The isolation valves allow brake pressure into the wheel brake cylinders to increase pressure during the apply mode, and the dump valves release pressure from the wheel cylinders during the dump mode. Wheel brake pressure is held constant during the hold mode.

A further development in braking technology has led to the introduction of traction control (TC) systems. Additional valves have been added to existing ABS to provide a braking system which controls wheel speed during acceleration. Excessive wheel speed during vehicle acceleration leads to wheel slippage and a loss of traction. An electronic control system senses this condition and automatically applies braking pressure to the wheel cylinders of the slipping wheel to reduce the slippage and increase the traction available. In order to achieve optimal vehicle acceleration, braking pressures greater than the master cylinder pressure must quickly be available when the vehicle is accelerating.

During TC the electronically controlled ABS valves provide similar apply, bold and dump modes to regulate the fluid pressure at the driven wheel brake cylinder. The ABS valves isolate the wheel brake cylinders from the master cylinder during TC by closing off a direct path therebetween. Braking pressure at the wheel brake cylinders can be achieved which is greater than the pressure at the master cylinder. A pressure operated redundant brake switch is added to the braking system to provide information about the status of the hydraulic brake circuit. The switch is actuated whenever the pressure at the master cylinder exceeds a first predetermined pressure. When the brakes are applied during traction control pressurized fluid from the master cylinder must be able to reach the wheel brake cylinders for base braking. The redundant brake switch indicates when normal braking has begun by sensing the increased master cylinder pressure. At this time, the ABS valves are controlled so that the master cylinder pressure can reach the wheel brakes and normal braking is resumed. It is desirable to control the ABS valves so that the wheel brakes are not isolated from the master cylinder throughout traction control so that the redundant brake switch can be eliminated.

During the hold mode the fluid pressures created by the pump can build. A bypass valve is used to alleviate the excessive fluid pressures by opening a closed loop return path between the outlet and inlet of the pump. The bypass valve opens when the fluid pressure becomes excessive. The valve must be built to handle the high pressure and perform reliably. If the valve should fail to open the fluid pressures could reach undesirable levels. It would be desirable to provide a valve which, when actuated, would prevent the pump from creating the high fluid pressures rather than venting the high pressure fluid. By preventing the pump from creating the high fluid pressures the current drawn by the pump motor is much lower, the durability of the pump improves and pump noise is reduced.

SUMMARY OF THE INVENTION

This invention relates to an anti-lock and traction control vehicular braking system. A hydraulic valve control scheme and method prevent excessive fluid pressure build-up during traction control mode. A braking system using the present valve control scheme and method draws less current by the pump motor, improves the durability of the pump, and reduces noise resulting from pump operation during traction control events.

In a preferred embodiment, a vehicular anti-lock and traction control braking system includes a master cylinder. A driven wheel brake is connected to the master cylinder via a first brake conduit. A non-driven wheel brake is connected to the master cylinder via a second brake conduit. A fluid supply is connected to an input of a pump. An output of the pump provides pressurized fluid to the driven and non-driven wheel brakes. A pump supply valve is disposed between the pump inlet and the fluid supply. A driven wheel isolation valve is disposed in the first brake conduit between the driven wheel brake and the master cylinder. The driven wheel isolation valve is opened to allow fluid communication between driven wheel brake and the master cylinder and closed to prevent fluid communication therebetween. A non-driven wheel isolation valve is disposed in the second brake conduit between the non-driven wheel brake and the master cylinder. The non-driven wheel isolation valve is opened to allow fluid communication between the non-driven wheel brake and the master cylinder and closed to prevent fluid communication therebetween. During a traction control event, the non-driven wheel isolation valve is opened to provide a circular fluid path from the pump output through the non-driven wheel isolation valve to the pump inlet.

Various objects and advantages of this invention will become apparent to those skilled in the art from the following detailed description of the preferred embodiment, when read in light of the accompanying drawings.

DETAILED DESCRIPTION OF TIE PREFERRED EMBODIMENT

Figure 1:
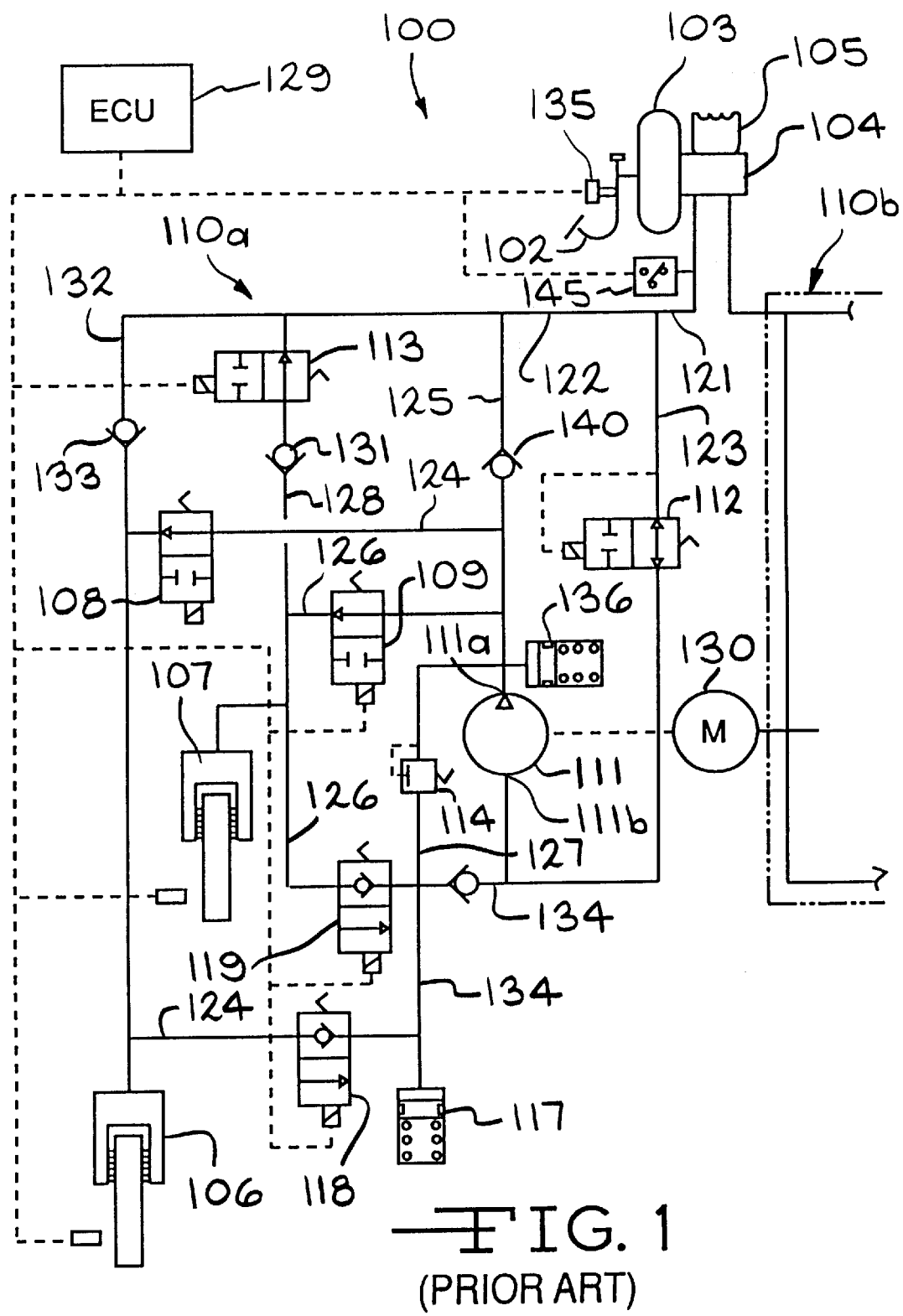
FIG. 1 is a hydraulic schematic of a prior art anti-lock and traction control braking system.

FIG. 1 illustrates an anti-lock and traction control braking system 100 known in the art A brake pedal 102 is connected to a booster 103 and a tandem master cylinder 104. A reservoir 105 is connected to the master cylinder 104 and holds a supply of brake fluid at atmospheric pressure. The tandem master cylinder 104 is connected to two similar but separate brake circuits 110a and 110b. For simplification of presentation, only components in circuit 110a will be discussed. Similar components can be found in circuit 110b.

A non-driven wheel brake 106 and a driven wheel brake 107 are connected to the master cylinder 104 via brake fluid conduit 121. Conduit 121 divides into conduits 122 and 123. Conduit 125 is connected between conduit 122 and the outlet 111a of a pump 111. Conduit 124 is connected to conduit 125 and is attached to the non-driven wheel brake 106. Conduit 125 is connected to conduit 126 and conduit 126 is attached to driven wheel brake 107. A normally open two-port, two position solenoid isolation valve 108 and 109 is located in each of the conduits 124 and 126, respectively. The isolation valves 108, 109 do not allow fluid flow in either direction when closed. An optional lip seal (not illustrated) may be used in one or both isolation valves to allow fluid flow from the wheel brakes when an isolation valve is closed. Conduit 123 is connected to the inlet 111b of the pump 111. A normally open two-port, two position pilot-operated pump supply valve 112 is located in conduit 123 between the master cylinder 104 and the pump 111.

The conduit 122 divides into conduits 128 and 132. The conduit 128 connects to conduit 126 between the driven wheel isolation valve 109 and the driven wheel brake 107. A normally open, two-port, two position solenoid valve 113 is located in conduit 128. A one-way check valve 131 is located in conduit 128 which allows fluid to flow through conduit 128 from the driven wheel brake 107, through the normally open solenoid valve 113 and back towards the master cylinder 104 but not in the opposite direction. Conduit 132 is connected to conduit 124 between the non-driven wheel isolation valve 108 and the non-driven wheel brake 106. A one-way check valve 133 is located in conduit 132 which allows fluid to flow through conduit 132 from the driven wheel brake 106 back towards the master cylinder 104 but not in the opposite direction.

Conduit 127 connects to the pump inlet 111b and outlet 111a and contains a bypass valve 114. The bypass valve 114 allows fluid under high pressure to flow in a circular path from the pump outlet 111a back to the pump inlet 111b. Conduit 134 is connected to the pump inlet 111b and to the conduits 124 and 126. A low pressure accumulator 117 is located in conduit 134. A two-position, two-way normally closed solenoid dump valve 118, 119 is located in conduits 124 and 126 respectively between respective wheel brakes 106, 107 and the low pressure accumulator 117. An electronic control unit (ECU) 129 is connected to each solenoid valve and shuttles the appropriate valves when necessary during ABS or traction control modes.

A brake position switch 135 is located near the brake pedal to indicate when the brake pedal 102 has been depressed and when the pedal has returned to its unactuated position. A pressure operated redundant brake switch 145 is provided in the main conduit 121. Only one switch 145 is required and it can be located in either half 110a, 110b of the system. The redundant brake switch 145 signals the ECU 129 as to the status of the hydraulic brake circuit. The switch 145 is actuated whenever the brakes are applied and the pressure in the main conduit 121 exceeds a first predetermined pressure. When the brakes are applied during traction control, pressurized fluid from the master cylinder must be able to reach the wheel brakes for base braking, but the non-driven wheel brake 106 is isolated from the master cylinder because valve 108 is closed. Also, the driven wheel brake 107 is isolated from the master cylinder 104 during traction control hold and dump modes because valve 109 is closed. The redundant brake switch 145 indicates that normal braking has begun and the wheel brakes should no longer remain isolated from the master cylinder. A threshold pressure of approximately 125 p.s.i. is used for the systems disclosed, but a different actuation pressure can be used which fits the specific requirements of the system. The switch 145 will deactuate when the pressure in conduit 121 falls below the threshold pressure. Alternatively, a second pressure threshold may be used to deactuate the switch 145.

A high pressure accumulator 136 is connected to the conduit 125 near the outlet of the pump 111a. The high pressure accumulator 136 stores high pressure fluid delivered from the pump, and provides a sufficient volume of high pressure fluid against the check valve 140 to prevent the brake pedal 102 from dropping.

During a base brake apply, the master cylinder pressurizes brake fluid when the driver pushes the brake pedal. Pressurized fluid flows from the master cylinder 104 through conduits 121, 122, and 125, through the isolation valve 108 and conduit 124 into the non-driven wheel brake 106. Pressurized fluid also flows to the driven wheel brake 107 from conduit 125 through conduit 126 and the isolation valve 109. The pressurized brake fluid reaching the wheel brakes 106 and 107 applies the brakes and slows the vehicle. Pressurized fluid also closes pilot-operated valve 112 thereby preventing pressurized fluid from reaching the pump inlet 111b.

When the brake pedal 102 is released, the master cylinder 104 no longer pressurizes the brake fluid which reduces the pressure at the wheel brakes 106 and 107. The reduction in brake pressure causes some of the fluid to return back to the master cylinder 104 and reservoir 105 through the isolation valves 108 and 109. Pressurized fluid at the non-driven wheel brake 106 returns through conduits 124 and 132, check valve 133, and conduits 122 and 121. Pressurized fluid at the driven wheel brake 107 returns through two paths. The first path includes conduit 126, isolation valve 109, conduits 125 and 124, isolation valve 108, check valve 133 and conduits 132, 122 and 121. The second path includes conduit 128, check valve 131 and valve 113 to conduit 122 and 121.

During an ABS event the dump mode is entered to reduce pressure in the wheel brake of the slipping wheel. In ABS dump mode, the valves 112 and 113 are closed and open, respectively. Solenoid-operated isolation valves 108 and 109 are shuttled closed by the ECU 129. The solenoid-operated dump valve 118, 119 corresponding to the wheel brake 106, 107 of the slipping wheel is shuttled open. The pressurized fluid flows through the dump valve and into the low pressure accumulator 117. The ECU 129 also energizes motor 130 to drive the pump 111. The pump 111 runs throughout much of the ABS event. The pump 111 pumps fluid from the wheel brake 106, 107 of the slipping wheel and the low pressure accumulator 117, through conduit 134 and in a circular path from pump outlet 111a to the pump inlet 111b through conduit 127 and the bypass valve 114 and a portion of conduit 134.

In ABS hold mode the pressure at the wheel brakes 106, 107 is held constant. The valves 112 and 113 remain closed and open, respectively. Isolation valves 108 and 109 remain closed and the open dump valves are also shuttled closed by the ECU 129. The pump 111 continues to pump fluid, increasing the fluid pressure at the pump outlet 111a until the pressure relief valve 114 opens and the pump 111 pumps fluid in a circular path through conduit 127 and the bypass valve 114.

When the affected wheel has reached near vehicle speed, the braking system enters ABS apply mode to begin braking the affected wheel again. In ABS apply mode, the valves 112 and 113 remain closed and open, respectively. The isolation valve 108, 109 corresponding to the affected wheel is pulsed open to apply pressurized fluid to the affected wheel brake 106, 107. The isolation valve is pulsed open and closed increasing the pressure until the pressures in all of the affected wheel brakes are equalized with the master cylinder pressure which concludes the ABS event or until the wheel slips again and dump mode is entered.

When the driven wheel begins to slip during acceleration, a traction control event occurs and braking pressure is applied to the slipping wheel. In traction control, the ECU 129 energizes motor 130 which drives the pump 111. Typically, the driver does not apply the brakes while accelerating and the pilot-operated supply valve 112 remains open during traction control. The pump draws fluid from the master cylinder 104 and reservoir 105 through the open supply valve 112 via conduits 121 and 123. Solenoid valve 113 is shuttled closed by the ECU 129 to isolate the pressurized fluid from the pump 111 at the driven wheel brake. Check valve 140 isolates the pump pressure from the master cylinder 104 preventing the pressure pulses from reaching the master cylinder through conduit 125. Solenoid valve 108 is shuttled closed to prevent fluid flow back to the master cylinder 104 through the check valve 133. The pump outlet 111a communicates with the driven wheel brake 107 through line 126 and the open isolation valve 109. The dump valves 118, 119 are closed. The isolation valve 109 controls the flow of pressurized fluid into the affected wheel brake until the proper driven wheel speed is obtained.

The traction control hold mode isolates fluid pressure at the driven wheel brake 107 closing the driven wheel isolation valve 109 and keeping the dump valve 119 closed. Valves 108 and 113 continue to be actuated to the closed position. If the pump pressure exceeds a predetermined pressure of approximately 2500 p.s.i., the bypass valve 114 opens to created a closed loop fluid path between the pump outlet 111a and pump inlet 111b and through conduit 127.

Pressure is relieved in the driven wheel brake 107 to decrease the braking force on the driven wheel during traction control dump mode. The driven wheel dump valve 119 is shuttled open and the isolation valve 109 is closed. Valves 112 and 113 remain open and closed respectively. The excess fluid returns to the master cylinder 104 and reservoir 105 via conduits 123 and 121. The pump 111 continues to operate and if the pump pressure reaches a predetermined pressure of approximately 2500 psi, the bypass valve 114 opens to create the closed loop path from pump outlet 111a to pump inlet 111b described above.

Figure 2:
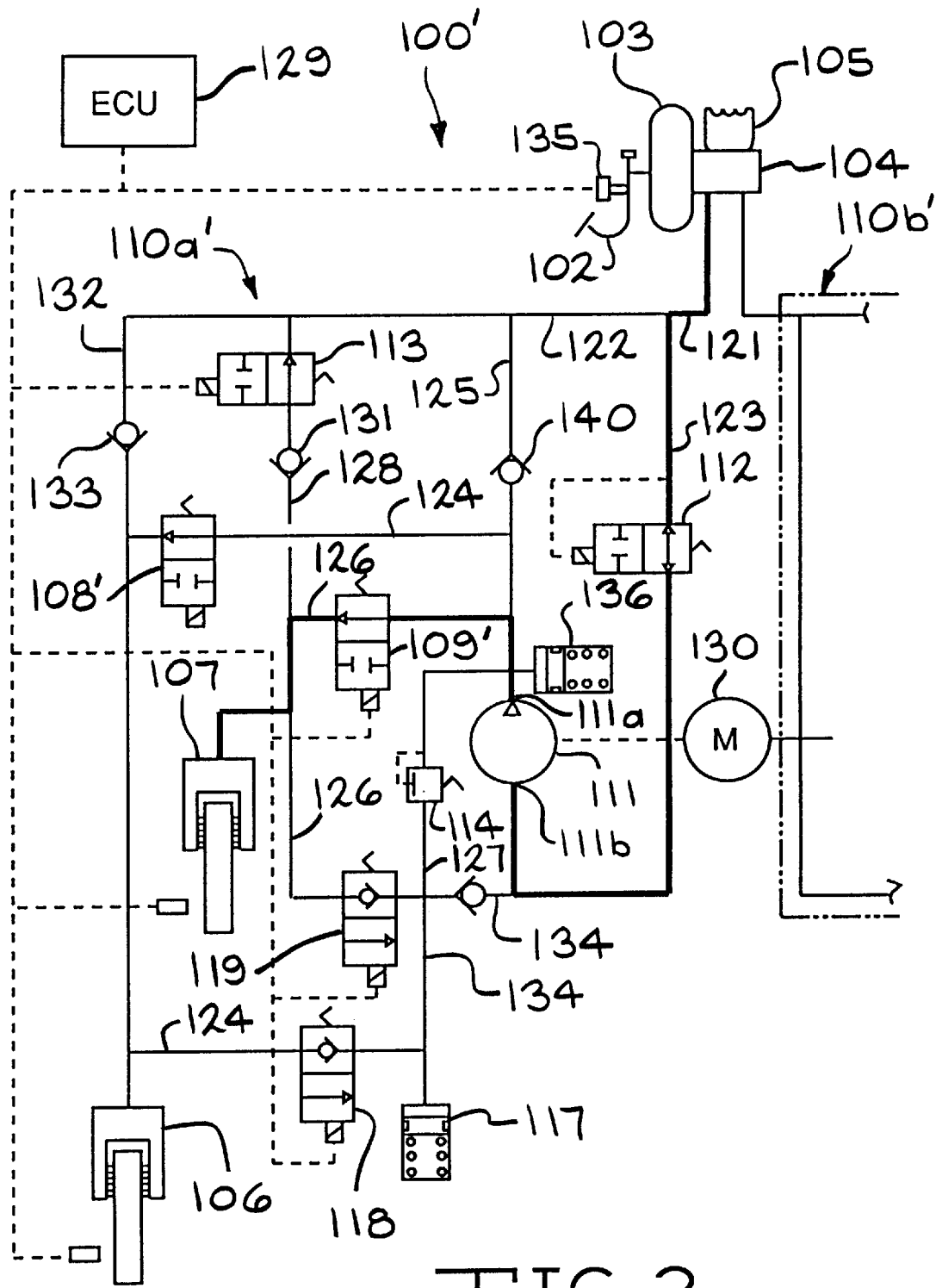
FIG. 2 is a hydraulic schematic of an anti-lock and traction control braking system in accordance with this invention illustrating a fluid flow path for a traction control apply mode.

Referring now to FIG. 2, an anti-lock and traction control braking system 100' similar to system 100 of FIG. 1 is shown. System 100' utilizes a valve control scheme which eliminates the redundant brake switch 145 of FIG. 1 by de-isolating the non-driven wheel from the master cylinder during operation in traction control modes. System 100' uses hydraulic components similar to system, except that an isolation valve 109' must be able to hold pressure in both directions when closed. The valve control schemes for base braking and all ABS modes for system 100' of FIG. 2 are identical to those described above for system 100 of FIG. 1.

During a TC apply event, the non-driven wheel isolation valve 108' is shuttled closed and the driven wheel isolation valve 109' is opened to apply pressurized fluid to the driven wheel brake 107. The fluid path for a TC apply event is indicated by the bold lines of FIG. 2. This operation is similar to the operation of system 100 during a TC apply event. If the driver steps on the brakes, pressurized fluid from the master cylinder can reach the driven wheels through check valve 140 and the open isolation valve 109'. The traction control apply mode lasts for only a brief period.

Figure 3:
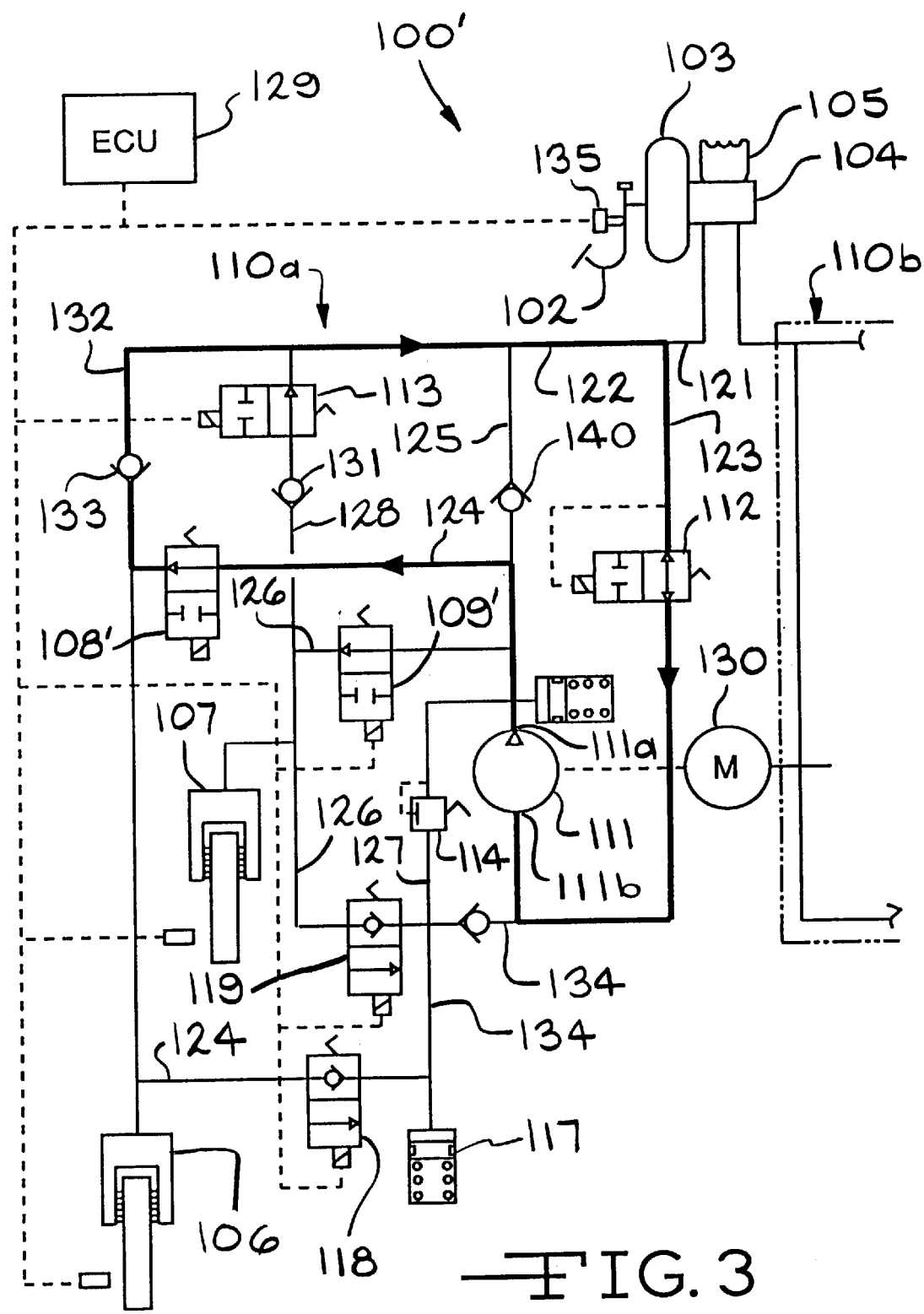
FIG. 3 illustrates a fluid flow path for a traction control hold mode in the system of FIG. 2.

Referring to FIG. 3, the fluid path during a traction control hold event is highlighted for system 100'. As mentioned above, the pressure at the driven wheel brake 107 is held constant during the traction control hold mode. The pump 111 is running and valve 112 is open as described above. The driven wheel isolation valve 109' and the traction control isolation valve 113 are shuttled to closed positions by the ECU 129 to maintain pressure at the driven wheel brake 107. During the traction control hold mode, the pump pressure can build to excessive pressures because the driven wheel isolation valve 109' is closed. To prevent the excessive pressure buildup while de-isolating the non-driven wheel brake 106 from the master cylinder 104, a circular flow path from the pump outlet 111a to the pump inlet 111b is created by opening the non-driven wheel isolation valve 108'. The circular flow path includes conduit 125, conduit 124, the opened non-driven wheel isolation valve 108', conduit 132, check valve 133, conduit 122 and conduit 123. The relief valve 114 is not opened because the pressure at the pump outlet 111a is prevented from climbing high enough to open the relief valve 114. The circular flow path prevents the pump 111 from creating excessive pressure, rather than creating large pressure which is relieved by valve 114, and this saves energy and reduces pump wear. The non-driven wheel brake 106 is not affected by the fluid flow because pressure does not build.

The open non-driven wheel isolation valve 108' maintains fluid communication between the master cylinder 104 and the non-driven wheel brake 106. The driver can apply the brakes during the traction control hold mode sending pressurized fluid from the master cylinder 104 through conduits 121, 122, and 125, through valve 140 conduit 124 and through the open non-driven wheel isolation valve 108' to the non-driven wheel brake 106. Therefore, the redundant brake switch 145 is not needed.

Figure 4:
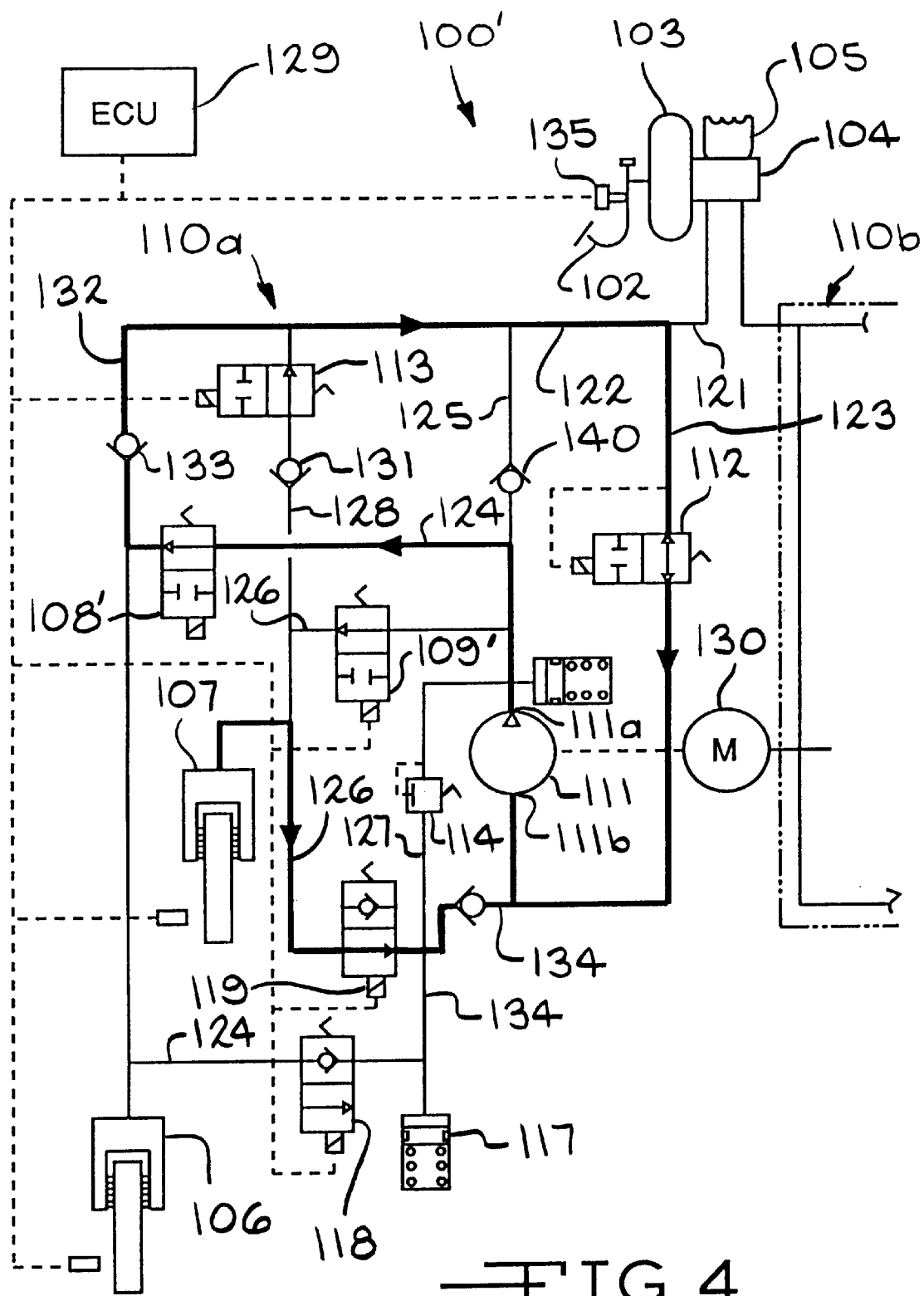
FIG. 4 illustrates a fluid flow path for a traction control hold mode in the system of FIG. 2.

FIG. 4 illustrates the flow path of system 100' during a traction control dump event. Valve 112 remains open as described above. The driven wheel isolation valve 109' and the traction control isolation valve 113 are shuttled to the closed position by the ECU 129. The driven wheel dump valve 119 is opened to release the pressurized fluid at the driven wheel brake 107. The fluid is pumped in a circular path from the pump outlet 111a to the pump inlet 111b including conduit 125, conduit 124, open non-driven wheel isolation valve 108', conduit 132, check valve 133, conduit 122 and conduit 123. The benefits of the circular flow path include consuming less energy, lower pump wear and de-isolating the non-driven wheel brake 106. Therefore, as described above, the driver can apply the brakes during the traction control dump mode, eliminating the need for the redundant brake switch 145.

The non-driven wheel brake 106 is only isolated from the master cylinder 104 during the relatively brief traction control apply mode. However, traction control apply mode only occupies a small amount of time compared to traction control hold and dump modes. The majority of the time during traction control, the non-driven wheel isolation valve 108' is open and the non-driven wheel brake 106 is de-isolated from the master cylinder. The driver can apply braking pressure to non-driven wheel brake 106 simply by pressing the brake pedal 102. Also, during TC apply mode, pressure is being applied to the driven wheel brake 107 from either the pump 111 or the driver-actuated master cylinder 104 if the master cylinder pressure is higher than the pump pressure. Therefore, a redundant brake switch 145 is not required to indicate that the driver is applying the brakes for system 100' shown in FIGS. 2 though 4.

In accordance with the provisions of the patent statutes, the principle and mode of operation of this invention have been described and illustrated in its preferred embodiment. However, it must be understood that this invention may be practiced otherwise than as specifically explained and illustrated without departing from its spirit or scope.

What is claimed is:

1. A vehicular anti-lock and traction control braking system comprising:
   a master cylinder;
   a driven wheel brake connected to the master cylinder via a first brake conduit;
   a non-driven wheel brake connected to the master cylinder via a second brake conduit;
   a fluid supply;
   a pump having in input connected to the fluid supply and an output for providing pressurized fluid to the driven and non-driven wheel brakes;
   a pump supply valve disposed between the pump inlet and the fluid supply;
   a driven wheel, normally open isolation valve disposed in the first brake conduit between the driven wheel brake and the master cylinder which is opened to allow fluid communication therebetween and closed to prevent fluid communication therebetween;
   a driven wheel, normally closed dump valve disposed in the first brake conduit between the driven wheel brake and the pump inlet which is opened to allow fluid communication therebetween and closed to prevent fluid communication therebetween,
   a non-driven wheel, normally open isolation valve disposed in the second brake conduit between the non-driven wheel brake and the master cylinder which is opened to allow fluid communication therebetween and closed to prevent fluid communication therebetween, wherein the non-driven wheel isolation valve is opened during a traction control mode to provide a circular fluid path from the pump output through the non-driven wheel isolation valve to the pump inlet; and
   a non-driven wheel, normally closed dump valve disposed in the second brake conduit between the non-driven wheel brake and the pump inlet which is opened to allow fluid communication therebetween and closed to prevent fluid communication therebetween.

2. The vehicular braking system defined in claim 1 wherein the non-driven wheel isolation valve is opened during a traction control hold event.

3. The vehicular braking system defined in claim 1 wherein the non-driven wheel isolation valve is opened during a traction control dump event.

4. The vehicular braking system defined in claim 1 wherein the non-driven wheel is de-isolated from the master cylinder during a traction control mode.

5. The vehicular braking system defined in claim 1 wherein the driven wheel isolation valve hold fluid pressure on both side when closed.

6. The vehicular braking system defined in claim 2 wherein the driven wheel isolation valve is closed.

7. The vehicular braking system defined in claim 3 wherein the driven wheel isolation valve is closed.

8. A method of providing traction control in a vehicular braking system comprising:
   providing a vehicular braking system including a driven wheel brake, a non-driven wheel brake, a master cylinder connected to the driven and non-driven wheel brakes, a pump having an inlet and an outlet, a driven wheel isolation valve connected between the pump outlet and the driven wheel brake, a driven wheel dump valve connected between the driven wheel brake and the pump inlet a non-driven wheel isolation valve connected between the pump outlet and the non-driven wheel brake, and a non-driven wheel dump valve connected between the non-driven wheel brake and the pump inlet; and
   pumping fluid from the pump outlet to the pump inlet through the non-driven wheel isolation valve while keeping pressure substantially constant at the driven wheel brake to prevent excessive pump pressure.

9. The method defined in claim 8 wherein the driven wheel isolation valve is closed to keep pressure substantially constant at the driven wheel brake.

10. The method defined in claim 8 including the step of opening the non-driven wheel isolation valve prior to pumping fluid from the pump outlet.

11. The method defined in claim 10 including the step of closing the driven wheel isolation valve prior to pumping fluid from the pump outlet.

12. A method of providing traction control for a vehicular braking system comprising:

providing a braking system including a driven wheel brake, a non-driven wheel brake, a tandem master cylinder connected to said driven and non-driven wheel brakes, a pump having an inlet and an outlet, a driven wheel isolation valve connected between said pump outlet and said driven wheel brake, a driven wheel dump valve connected between the driven wheel brake and the pump inlet, a non-driven wheel isolation valve connected between said pump outlet and said non-driven wheel brake; and a non-driven wheel dump valve connected between the non-driven wheel brake and the pump inlet; and preventing excess pump pressure by pumping fluid from said pump outlet to said pump inlet through said non-driven wheel isolation valve while relieving pressure at said driven wheel brake.

13. The method defined in claim 12 wherein the driven wheel isolation valve is closed to keep pressure substantially constant at the driven wheel brake.

14. The method defined in claim 12 including the step of opening the non-driven wheel isolation valve prior to pumping fluid from the pump outlet.

15. The method defined in claim 12 including the step of closing the driven wheel isolation valve prior to pumping fluid from the pump outlet.

* * * * *